United States Patent [19]

Wurz

[11] Patent Number: 5,269,823
[45] Date of Patent: Dec. 14, 1993

[54] MIST ELIMINATOR

[76] Inventor: Dieter Wurz, Gartenweg 7, 7570 Baden-Baden, Fed. Rep. of Germany

[21] Appl. No.: 915,624

[22] Filed: Jul. 21, 1992

[30] Foreign Application Priority Data

Apr. 29, 1992 [DE] Fed. Rep. of Germany ....... 4214094

[51] Int. Cl.$^5$ .............................................. B01D 45/08
[52] U.S. Cl. .................... 55/440; 55/257.2; 55/443
[58] Field of Search ..................... 55/257.2, 257.3, 440, 55/442, 443, 462, 465

[56] References Cited

U.S. PATENT DOCUMENTS

| 1,926,924 | 9/1933 | Sylvan | 55/440 |
|---|---|---|---|
| 3,953,183 | 4/1976 | Regehr | 55/440 |
| 4,014,669 | 3/1977 | Thompson et al. | 55/257.2 |
| 4,072,478 | 2/1978 | Regehr et al. | 55/257.2 X |
| 4,240,814 | 12/1980 | Regehr et al. | 55/440 X |
| 4,530,707 | 7/1985 | Ovard | 55/257.2 X |
| 4,543,108 | 9/1985 | Wurz | 55/440 X |
| 4,802,901 | 2/1989 | Wurz et al. | 55/440 |
| 4,975,101 | 12/1990 | Swanborn | 55/440 |
| 5,104,431 | 4/1992 | Fewel, Jr. | 55/443 X |

FOREIGN PATENT DOCUMENTS

| 0178515 | 4/1986 | European Pat. Off. | 55/440 |
|---|---|---|---|
| 0348009 | 12/1989 | European Pat. Off. | 55/440 |
| 3702830 | 2/1988 | Fed. Rep. of Germany . | |
| 578985 | 11/1977 | U.S.S.R. . | |
| 1465044 | 2/1977 | United Kingdom . | |

OTHER PUBLICATIONS

Untersuchen des Abscheideverhaltens von Tropenfanggittern in Senkrecht aufsteigendem Lufstrom, by Peter Engels, Feb. 25, 1971.

Primary Examiner—Robert Spitzer
Attorney, Agent, or Firm—Laubscher & Laubscher

[57] ABSTRACT

A mist eliminator for eliminating droplets from a liquid-laden gaseous flow, comprising wave-shaped profiles each including an entrant part configured as a half-wave of small amplitude and wavelength, a central part configured as a principal wave of large amplitude and wavelength, and an exit part of small amplitude and wavelength, the profiles including flow passages with reversing portions where the gaseous flow is alternately accelerated and decelerated, respectively, characterized in that the wave shape of the profiles is modified as compared to a sine-wave such that the turning points of each profile at least on the eliminating surfaces of the central part are shifted in downstream direction.

7 Claims, 4 Drawing Sheets

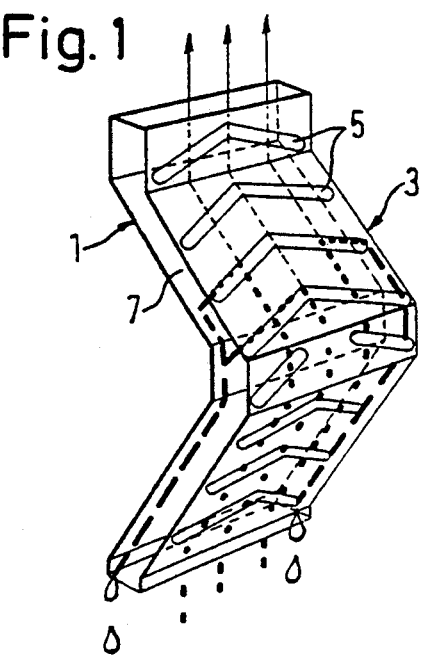
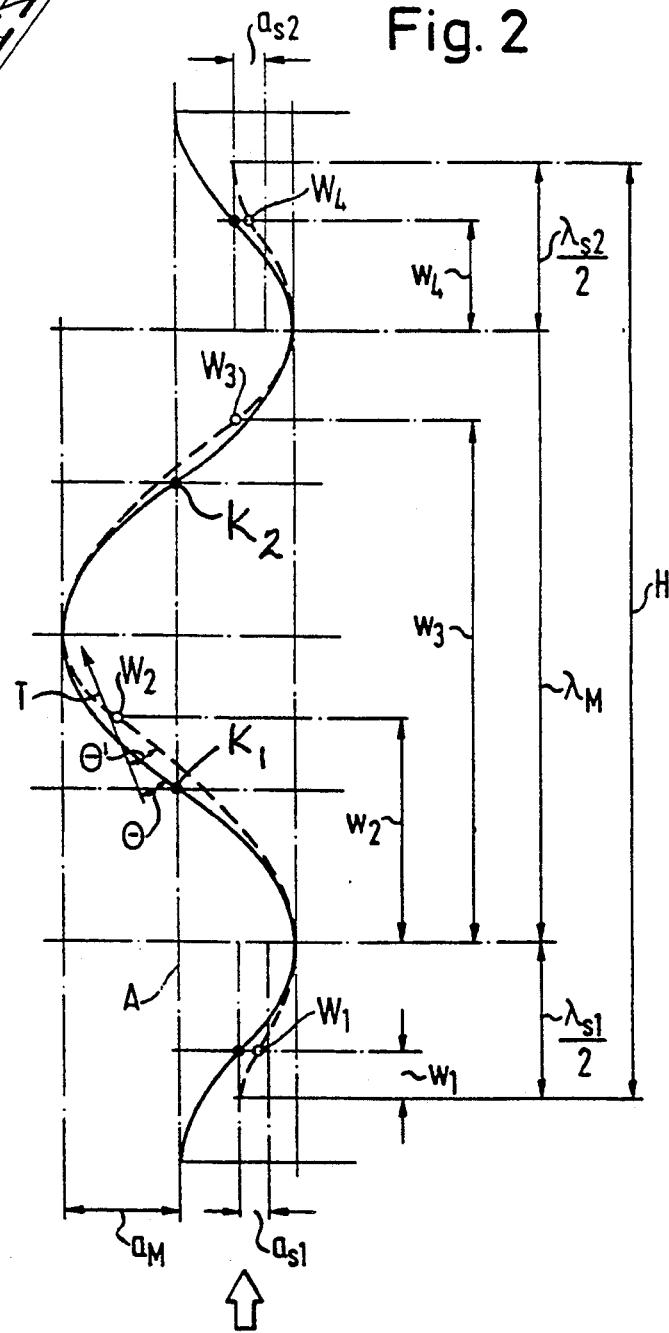

MIST ELIMINATOR

STATEMENT OF THE INVENTION

The present invention is directed to a mist eliminator for eliminating droplets from a liquid-laden gaseous flow, said mist eliminator comprising wave-shaped profiles each including an entrant part configured as a half-wave of small amplitude and wavelength, a central part configured as a principal wave of large amplitude and wavelength, and an exit part of small amplitude and wavelength, said profiles constituting flow passages with reversing portions in which the gaseous flow is alternately accelerated and decelerated.

BRIEF DESCRIPTION OF THE PRIOR ART

First of all, the essential characteristics of mist eliminators of the specified kind as well as the relevant technical terms will be discussed briefly. A reversing portion is considered to extend from the end of the profile to the next-following turning point of the profile curvature or, respectively, between two turning points.

Primary droplets are droplets which enter the mist eliminator together with the gaseous phase.

Droplet limit diameter: refers to droplets having a diameter which is greater than the droplet limit diameter and are in wall contact within the mist eliminator. Here, however, droplet reflection may occur so that such droplets—similar to a billiard ball—may pass the mist eliminator due to "cushion reflection" occurring either once or several times. Hence, the actual droplet limit diameter in the gas downstream of the mist eliminator is greater than the calculated value which so far cannot yet be corrected theoretically in respect of the events occurring upon reflection.

Droplet entrainment occurs when larger droplets are pulled out by the action of the gaseous flow from water accumulations which have formed on the eliminating walls of the mist eliminators. In the case of horizontally installed mist eliminators, in which the flow is guided vertically upwardly, the reentrainment limit, i.e. the velocity at which droplet entrainment will occur under certain boundary conditions, is within the range of 3.5 to 5.5 $m.s^{-1}$. Droplets which could pass through the mist eliminator due to reflection or entrainment are called secondary droplets.

Under all conditions, the reentrainment limit must not be exceeded. The reentrainment limit depends, on the one hand, on the flow velocity of the gaseous phase, the loading with droplets and the size distribution of droplets, the physical properties of the two phases, but it also greatly depends on the geometry of the eliminator profiles. In this context, the geometry relates both to the macrostructure and the microstructure right to the surface roughness.

As the velocity distribution (for instance, in the scrubbing column of a flue gas desulfurizing plant) may exhibit considerable inhomogeneities there is a risk that in some areas the reentrainment limit will be exceeded although the mean flow velocity is still far below said limit value. There is therefore a great demand for mist eliminators which exhibit a high reentrainment limit so that there exists a considerable safety margin relative to the design value. Furthermore, a mist eliminator exhibiting a high reentrainment limit enables a reduction of the assembly cross-section which in turn permits a decrease in costs. Furthermore, high flow velocities are of course advantageous in that the limit diameter of droplets which are only just eliminated will decrease with an increase in flow velocity; thereby the percentage of those droplets is reduced which may pass the mist eliminator, and therefore loading of the gas with remaining droplets is reduced.

Of course, the pressure loss of a mist eliminator should normally be small. This holds particularly for the use in natural draught cooling towers. But in flue gas scrubbing plants the flow approaching the mist eliminators may be so non-uniform that a certain increase of the pressure loss in the mist eliminator might be an advantage so as to make the field of flow uniform.

Small tendency towards incrustations as well as a cleaning-friendly geometry is one of the decisive properties of mist eliminators for use under boundary conditions which may cause the formation of deposits on the profile elements. The fact that in addition to these aspects of process technology also the dimensions of the mist eliminator, the material requirements and the manufacturing costs are very important should certainly be taken into consideration when a mist eliminator profile is developed.

Mist eliminators of the kind described above have been on the market for many years.

A conventional mist eliminator includes two adjacent spaced profiles having obliquely extending drainage flutes through which the eliminated liquid is directed into the corners between the baffle surfaces and the bulkhead walls, the latter being arranged every 10 cm. This mist eliminator may therefore be used also for relatively high, vertically upwardly directed gas flow velocities and a high droplet loading of the gas without the risk of droplet entrainment. It has been found, however, that under certain boundary conditions this eliminator has a tendency to incrustations and cannot readily be cleaned. One of the reasons the approximately horizontally extending drainage flutes as well as the relatively closely adjacent bulkhead walls. The bulkhead walls protect some portions from the conical jet stream which is directed towards the mist eliminator for cleaning the solids-incrusted surfaces. Hence, there is a demand for a mist eliminator which offers at least the same high eliminating performance (similar droplet limit diameter, similar reentrainment limit) and which does not exhibit the mentioned drawbacks and is less expensive to manufacture, for instance by extrusion instead of injection moulding.

The mist eliminator disclosed in German Patent No. DE 37 02 830 Cl substantially satisfies these requirements. The characteristic feature of the known eliminator is a continuous taper of the effective channel cross-section between two adjacent profiles across at least two effective deflecting or reversing portions. The known eliminator is distinguished by particularly small pressure losses while it exhibits a good eliminating performance.

British Patent No. GB 1,465,044 A discloses a mist eliminator in which the wavelength decreases in the direction of main flow. Swiss Patent No. SU 197,711 A discloses and describes a mist eliminator of rotationally symmetric overall configuration, in which an increase in wavelength and wave amplitude in flow direction is compulsory. But the essential teaching of the instant application is that for orthogonal approach flow towards the mist eliminators, wavelength and amplitude advantageously should be designed so as first to increase and then to decrease, so that the larger droplets are collected in the front portion and the smaller primary droplets are collected in the middle portion, whereas reflected larger droplets are collected in the exit portion, the result being significant advantages in respect of flow behaviour (smaller pressure loss, higher reentrainment velocity). In a mist eliminator having the features of the dissertation by Engels (Peter Engels: "Untersuchungen des Abscheideverhaltens von Tropfenfanggittern in senkrecht aufsteigendem Luftstrom"; dissertation, RWTH Aachen, 1971), the skeleton line of which is drawn as a full line in FIG. 2, waves of small length and small amplitude, so-called satellite waves, are shown on the entrance and the exit side while a wave of large wavelength and amplitude, a so-called principal wave, is shown in the middle portion. Principal and satellite waves are exactly sinusoidal.

SUMMARY OF THE INVENTION

It is the objective of the instant invention to provide a mist eliminator which enables a very good eliminating performance with reduced droplet reflection and increased reentrainment velocity.

The specified object is to provide a mist eliminator having profiles the wave shape of which is modified as compared to a sine-wave such that the turning points of each profile at least on the eliminating surfaces of the central portion are shifted in downstream direction.

The mist eliminator profiles according to the instant invention are composed of a plurality of non-sinusoidal wave sections, in which the shifting in the downstream direction of the turning points as compared to pure sine-waves results in a suppression of droplet reflection and an increase of the reentrainment velocity due to the thus achieved larger angle of impact on the effective eliminating surfaces.

A more specific object of the invention is to provide a mist eliminator having profiles with a configuration and dimensions relative to the profile centerlines such that the profiles have finite profile thickness (which is variable along the profile height. On an average, this profile thickness upstream of first reversing portion is kept smaller than 20% of the distance of the center lines of two adjacent profiles. Also, in a preferred mist eliminator according to the instant invention the changes of curvature of the profiles are substantially constant along the profile height.

With the profiles according to the instant invention, the waves are not sinusoidal but are asymmetric. With such profiles the reentrainment velocity could be increased from a previous optimum value of commercially available products from ~5 m.s$^{-1}$ (horizontal installation) to ~6 m.s$^{-1}$ while mist elimination was maintained at the same level (same droplet limit diameter).

BRIEF DESCRIPTION OF THE DRAWINGS

The present invention will be described in detail with reference to embodiments thereof and to schematic drawings, in which:

FIG. 1 is a perspective view of the two profiles of a commercially available mist eliminator;

FIG. 2 is a comparative illustration of the outlines of the profiles of two mist eliminators, in which the full line indicates a profile in accordance with the Engels dissertation and the dashed line indicates a profile in accordance with the instant invention;

DETAILED DESCRIPTION

Referring first more particularly to the prior art mist eliminating apparatus of FIG. 1, a pair of parallel spaced profiles 1 and 3 are provided having corresponding waveform configurations, obliquely extending drainage flutes 5 being provided through which the eliminated liquid is directed into the corners between the baffle surfaces and the bulkhead walls 7 which are arranged every 10 cm.

Figure 3:
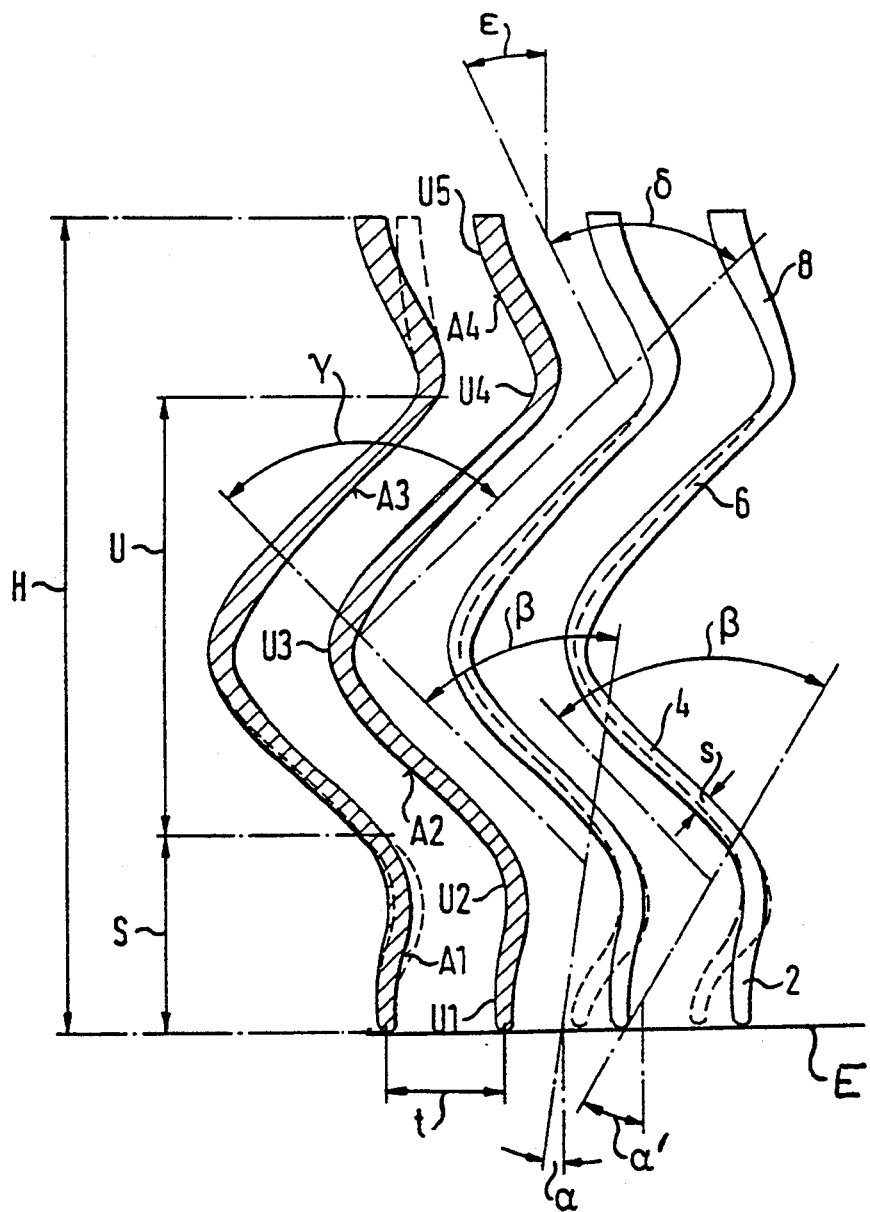
FIG. 3 illustrates adjacent profiles of an embodiment of a mist eliminator according to the instant invention, in which modifications of the profiles which are within the scope of the invention are drawn in dashed lines.
Figure 4:
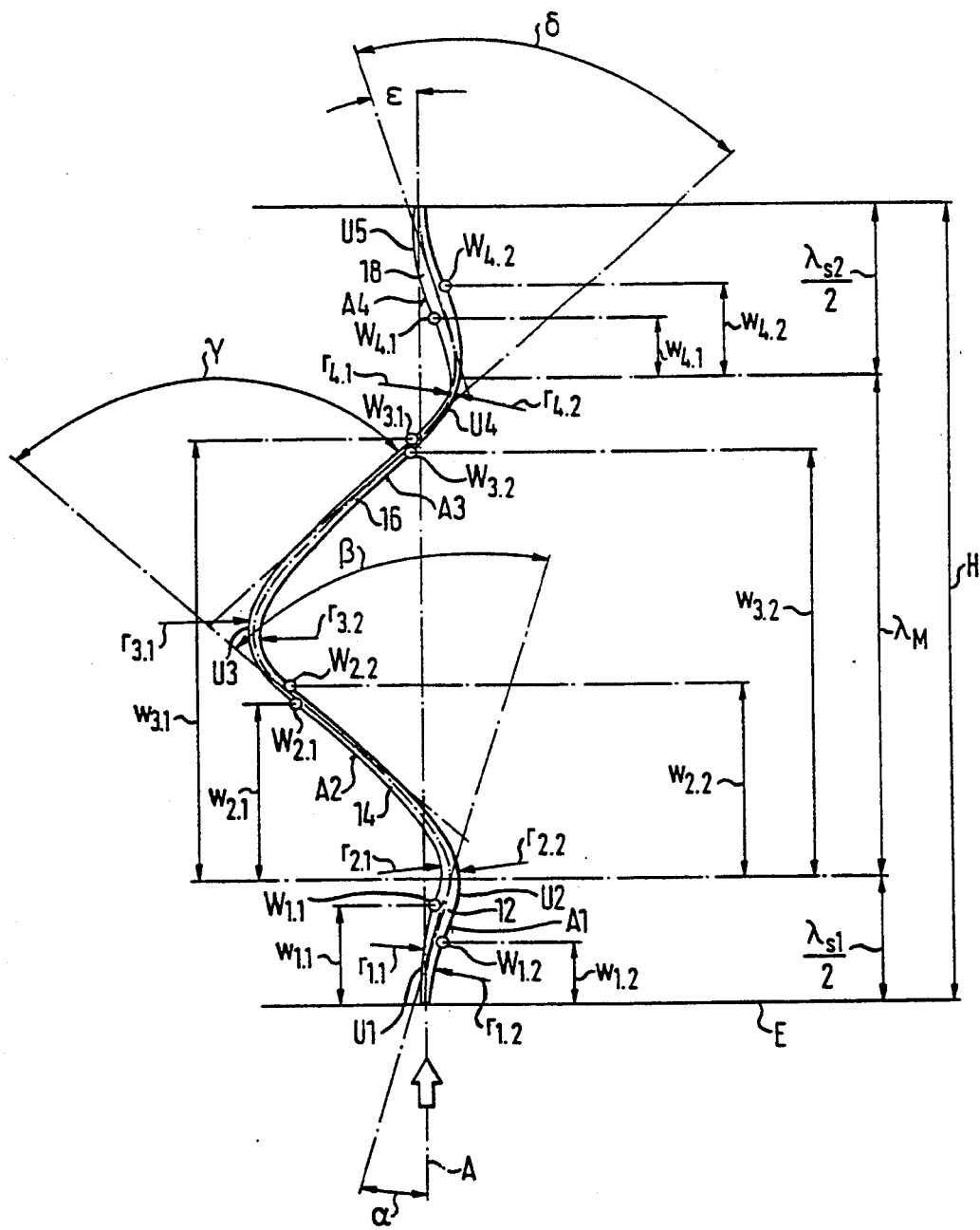
FIG. 4 is a sectional view similar to FIG. 3 showing a further modification of a profile for a mist eliminator according to the instant invention, which enables particularly high reentrainment velocities.

The profiles illustrated in FIGS. 2 to 4 show five reversing portions $U_1$-$U_5$ and four turning points $W_1$-$W_4$, said reversing portions $U_1$-$U_5$ and four turning points $W_1$-$W_4$, being taken from one turning point to the next turning point of the profile contour. The left-hand-side and righthand-side turning points are not necessarily directly opposite each other.

In the entrance area the profiles are curved beyond the orthogonal to the entrance plane ("over-curved"). With the configurations illustrated in FIGS. 2 to 4 this over-curvature is cancelled towards the entrance plane so that the center (or skeleton) of the profile terminates orthogonally to the entrance plane. In this way an entrance satellite wave is formed which is advantageous in respect of fluid technology. The special achievement of this configuration is that even in the case of an obliquely approaching flow towards the mist eliminator, larger droplets hardly have a chance to penetrate by direct flight to the third eliminating surface. Should this still happen up to a certain percentage, it will be possible to trap droplet fragments, which are formed particularly when larger droplets strike wetted wall portions, on the eliminating surface downstream thereof.

In FIG. 2, the parameters $\lambda_{s1}$, $\lambda_{s2}$ indicate the wavelengths of the short satellite waves in the direction upstream and downstream of the principal wave the wavelength of which is referenced $\lambda_M$, $a_{s1}$, $a_{s2}$ are the amplitudes of the satellite waves, whereas $a_M$ is the amplitude of the principal wave. $w_1$, $w_2$ and $w_3$ indicate the turning point distances from extreme amplitude values of the mentioned waves, whereas H is the height of the overall profile.

The full-line sine-wave corresponds to the profile configuration proposed in the Engels dissertation, while the dashed line illustrates a profile configuration in accordance with the invention. It will be apparent that the turning points $W_2$ and $W_3$ of the principal wave of the profile of the present invention are displaced to the rear in flow direction relative to the corresponding turning points $K_1$, $K_2$ of the pure sinewave. This has the effect that in an area to the left of the dash-dotted central axis A with a predetermined direction of approach (arrow T) of the droplets the angle of impact $\theta'$ becomes larger with a profile according to the invention than the angle of impact $\theta$ with the sine-wave profile of Engels, so that droplet reflection will be reduced. Of course, one has to accept that in the area to the right of the central axis A conditions are reversed, but this is irrelevant because the droplets impacting in this area will in any case strike at an angle where any reflection is substantially excluded. By the realization of the dashed non-sinusoidal profile with the turning points $W_2$ and $W_3$ displaced to the rear in flow direction it is possible to achieve a considerable improvement of the eliminating efficiency.

It should be noted that the turning points $W_1$ and $W_4$ in the area of the satellite waves need not be displaced relative to the comparable turning points of the sine-wave profile.

The profile dimensions are generally as follows:

$\lambda_{s1}/H \approx 0.25-0.35$ (preferably 0.30)

$\lambda_{s2}/H \approx 0.25-0.50$ (preferably 0.40)

$\lambda_M/H \approx 0.50-0.75$ (preferably 0.65)

$a_{s1}/H \approx 0.01-0.04$ (preferably 0.025)

$a_{s2}/H \approx 0.01-0.04$ (preferably 0.025)

$a_M/H \approx 0.08-0.16$ (preferably 0.12)

$\dfrac{w_2}{\lambda_M} \approx 0.25 - 0.40$ (preferably 0.35)

$\dfrac{w_3}{\lambda_M} \approx 0.75 - 0.94$ (preferably 0.86)

wherein $\lambda_{s1}, \lambda_{s2}, \lambda_M$ = wavelengths; $a_{s1}, a_{s2}, a_M$ = amplitudes; $w_1, w_2, w_3$ = turning point distances of extreme amplitude values of the various waves, and H = height of the overall profile.

The following description refers to the profile design illustrated in FIG. 3.

FIG. 3 shows profiles with profile sections 2, 4, 6, 8 which extend between a total of five reversing portions U1 to U5 and have been configured on the basis of the principal concept with due consideration of the possible interactions between droplets and wall and, respectively, a liquid film covering the wall (possible interactions: droplet reflection, droplet destruction, droplet collection). A further objective was an optimum distribution of the shear stress which the gaseous flow imparts on the film formed on the wall by collected droplets. This is of decisive importance for achieving a high reentrainment limit. For a precise description of these profiles and for providing a relationship with the prior art it would be appropriate to deviate from the nomenclature as introduced in FIG. 2 for the extension of the center line.

The over-curvature in the front area as represented by two alternatives for the angles $\lambda$ and $\lambda'$ should be within a range of c. 5° to 35°, preferentially 15°, in which a divergent channel extension is configured already after the first reversing portion. Consequently, any liquid reaching the "sink" of said area may drain off laterally when the package of baffles is inclined. On this side of the profile, the gaseous flow imparts only little shear stress to the liquid film due to divergence and curvature of the channel, so that the liquid film is not drawn along towards the exit of the separating channel as long as the very high reentrainment velocity is not exceeded.

The second reversing portion U2 as the entrance part of the principal wave is still relatively slight with angles $\beta$ and $B_1$ being between about 40°-80° preferentially 60°) so that only larger droplets are collected on the separator surface A2. This offers the advantage that the amount of liquid collected here does not become excessive so that the reentrainment limit also within this section will only be reached at higher velocities. Finer droplets are only collected predominantly behind the third reversing portion U3 on separator surfaces A3, which is due to a significantly larger reversing angle ($\gamma \approx 70°-110°$, preferentially 90°). The third reversing portion U3 is likewise initially divergent and thereafter convergent, the reasons being the same as with the reversing portion U2. In order to achieve maximum droplet elimination also in case of an obliquely approaching flow towards the eliminator entrance plane, which frequently cannot be avoided for instance in scrubbing units of flue gas desulfurizing plants, a divergent/convergent fourth reversing portion U4 having an eliminating surface A4 is provided on the down-stream side. Here, the reversing angle ($\delta \approx 38°-75°$, pre-ferentially 50°) may again be smaller since it is not fine primary droplets that are to be collected on the eliminator surface A4 but at most larger secondary droplets which in case of an obliquely approaching flow have reached the surface A3 and have not been collected thereat but have burst on impact into smaller droplets, the diameter of said smaller droplets being, however, still distinctly larger than the theoretical droplet limit diameter. The fourth reversing portion U4 is followed by a fifth reversing portion U5 ($\gamma \approx 0°-30°$). This reversing portion has the primary function of providing for an orthogonal outgoing flow which is advantageous from a fluid-mechanical aspect (satellite exit wave). If an oblique outgoing flow from the mist eliminator is advantageous for the flow in the following gas passageways, the said reduction of the exit-side profile over-curvature may be omitted.

Already in the fourth reversing portion U4 the profile is enlarged to its final thickness.

Basically, the profile design shown in FIG. 3 has the same configuration as that illustrated in FIG. 4 and follows the same dimensioning rules as those specified above with reference to FIG. 2. However, the profile shown in FIG. 4 is preferred over that shown in FIG. 3 when it is intended to realize a particularly high reentrainment velocity. The profile shown in FIG. 4 comprises profile portions 12, 14, 16, 18 basically corresponding to the profile portions 2, 4, 6, 8. But here the magnitudes of the angles $\alpha, \beta, \gamma, \delta$ and $\epsilon$ at which the individual reversing portions U1, U2, U3, U4 and U5 are inclined relative to each other and illustrated in the drawing are different from FIG. 3. Also, the overall profile illustrated in FIG. 4 is slimmer than that of FIG. 3, i.e. a smaller profile thickness has been realized. However, the distance between the center lines of the two adjacent profiles is basically the same as in FIG. 3.

Additionally, in FIG. 4 the turning points W are respectively indicated by two indices of which the first one refers to the number of the reversing portion and the second one refers to the respective side of the profile. Here, the lefthand side of the profile is indicated by the index 1 while the righthand side of the profile is indicated by the index 2. Hence, $W_{1,2}$ means that the turning point downstream of the first reversing portion U1 on the righthand side of the profile (2) is concerned, and so forth. It will be apparent that the turning points on the effective surfaces A1, A2, A3, A4 have been shifted—as viewed in flow direction—to be upstream of the turning points on the wall surfaces which have no eliminating effect. The correspondingly indexed small letters w respectively indicate the distances of the turning points from the entrance plane E (only for the first turning points $W_{1.1}$ and $W_{1.2}$) and of the turning points of the principal wave as measured from the "wave crest" at reversing portion U2 and finally the distances of the turning points in the exit satellite wave from the reversing point U4.

Furthermore, FIG. 4 shows the radii of curvature r for the different curvatures at the various reversing portions U1 to U5 on either side of the profile, the radii of curvature r being doubly indexed similar to the turning points W.

With these data which are apparent from FIG. 4 it is possible to realize a profile that is particularly advantageous in respect of the reentrainment limit.

Figure 5:
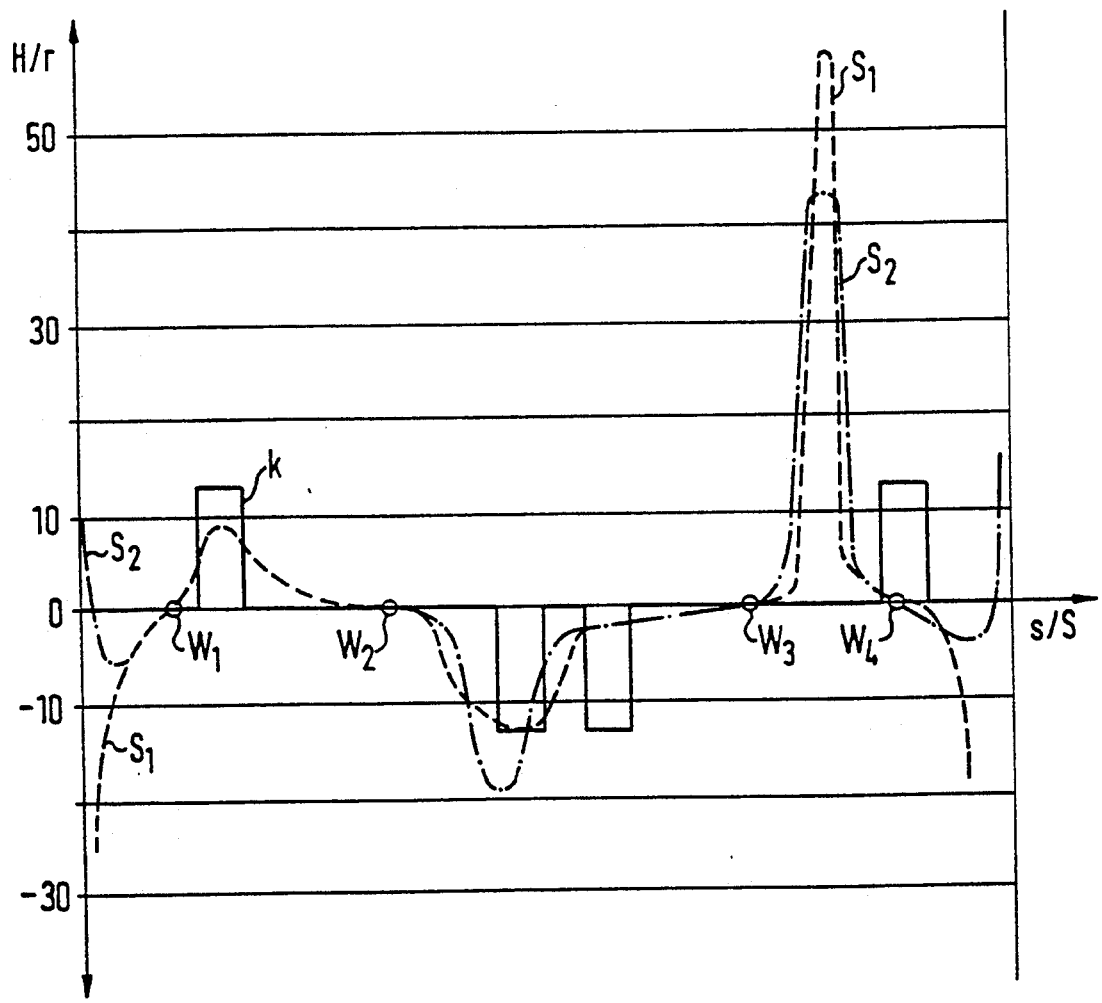
FIG. 5 is a diagram in which the quotient of profile height H and radius of curvature r for both profile sides of a mist eliminator according to the invention is plotted on the ordinate in dashed lines for the left-hand profile side of FIG. 3 or 4 and in dash-dotted lines for the right-hand profile side, versus the quotient of the progressive developed profile length s relative to the overall profile length S.

FIG. 5 illustrates the profile curvature on either side of a mist eliminator of FIG. 3 compared with the commercially available mist eliminator shown in FIG. 1. The quotient of the profile height H to the respective radius of curvature r is plotted on the ordinate, whereas the quotient of the progressive coordinate s in the direction along the profile relative to the overall profile length S of the developed profile is plotted on the abscissa. The lefthand-side curvature $s_1$ is illustrated in dashed lines while the righthand-side curvature $s_2$ of the profile of FIG. 3 is indicated in dash-dotted lines. Also, the positions of the turning points $W_1$, $W_2$, $W_3$, $W_4$ are shown (the indices refer to the associated reversing portions).

It will be apparent that—in contrast to the commercially available conventional profile according to FIG. 1—a profile in accordance with the present invention exhibits no discontinuities along the curvature. This will be one of the reasons for the particular success of the profile of the instant invention. To explain the rectangular shape of the curvature function k above the normalized profile length according to FIG. 1 it should be noted that with the profile shown in FIG. 1, planar portions are interconnected by circular arcs. Accordingly, the curvature k is a "step function" with deflections between 0 and $1/r = 13$.

A comparison between the dashed curve and the dash-dotted curve in FIG. 5 for the profile of the instant invention as shown in FIG. 3 will show that the curvatures $s_1$ and $s_2$ on either side of the profile are approximately equal except for different shapes in the entrance and exit and at the extreme locations. This results in a practically coincident position of the turning points $W_1$ to $W_4$ on both sides of the profile. The different shapes in the entrance and exit especially with respect to the signs result from the fact that mathematically, a clockwise continuation is defined as negative and an anticlockwise continuation is defined as positive.

I claim:

1. Mist eliminating apparatus for removing droplets of liquid from a liquid-laden gas flow, comprising:
   (a) at least two corresponding wave-shaped profiles spaced to define therebetween a flow passage, each of said profiles including:
      (1) an entrance portion having the configuration of a half-wave of relatively small amplitude and wavelength;
      (2) a central portion having the configuration of a principal wave of relatively large amplitude and wavelength; and
      (3) an exit portion of relatively small amplitude and wavelength, whereby said profiles define within said flow passage reversing portions within which the gaseous flow is alternately accelerated and decelerated, respectively;
   (b) the configuration of at least the central portion of each profile being non-sinusoidal and such as to define flow reversing portions having turning points ($W_2$, $W_3$) that are displaced in the downstream direction from the corresponding turning points ($K_1$, $K_2$) of a corresponding pure sine wave.

2. Apparatus as defined in claim 1, wherein each of said profiles has the dimensions:

$\lambda_{s1}/H \approx 0.25-0.35$ $\lambda_{s2}/H \approx 0.25-0.50$ $\lambda_M/H \approx 0.50-0.75$ $a_{s1}/H \approx 0.01-0.04$ $a_{s2}/H \approx 0.01-0.04$ $a_M/H \approx 0.08-0.16$ $\frac{w_2}{\lambda_M} \approx 0.25 - 0.40$ $\frac{w_3}{\lambda_M} \approx 0.75 - 0.94$ in which $\lambda_{s1}$, $\lambda_{s2}$, $\lambda_M$ = wavelengths; $a_{s1}$, $a_{s2}$, $a_M$ = amplitudes; $w_1$, $w_2$, $w_3$ = turning point distances of extreme amplitude values of the various waves, and H = height of the overall profile.

3. Apparatus as defined in claim 2, wherein the thickness of each profile upstream from said first reversing portion is less than about 20% of the distance (t) between the center lines of two adjacent profiles.

4. Apparatus as defined in claim 1, and further wherein:
   (c) said flow passage includes:
      (1) an input extending generally normal to an entrance plane (E) defined by the leading edges of the profiles;
      (2) a first slight reversing portion (U1) having an angle of inclination ($\alpha$) of between 5° and 35° relative to the direction of the outgoing flow at from between 5% to 20% of the total profile height (H);
      (3) a second reversing portion (U2) in opposition to said first reversing portion at an angle of inclination ($\beta$) that is between about 40° to 8° relative to the profile section (2, 12) following said first reversing portion, said second reversing portion having a height that is about 13% to 35% of the total profile height, said second reversing portion having an inner radius of curvature ($r_{2.1}$) that is between 5% to 18% of the profile height and an outer radius of curvature ($r_{2.2}$) that is about 6% to 20% of the total profile height;
      (4) a third reversing portion (U3) in opposition to said second reversing portion and having an angle of inclination ($\gamma$) of from 70° to 110° relative to the angle of inclination of the profile section (4,14) following said second reversing portion, said third reversing portion having a height that is between 15% to 45% of the total profile height, and an inner radius of curvature ($r_{3.2}$) of from 3% to 12% of the total profile height, and an outer radius of curvature ($r_{3.1}$) that is between 6% to 18% of the total profile height;

(5) a fourth reversing portion (U4) in opposition to said third reversing portion and having an angle of inclination ($\delta$) between 38° to 75° relative to the profile section (6,16) following the third reversing portion, said fourth reversing portion having a height that is between 10% to 20% of the profile height and an inner radius of curvature ($r_{4.1}$) of between 2% to 10% of the total profile height, and an outer radius of curvature ($r_{4.2}$) that is between 6% to 15% of the total profile height; and (6) a fifth reversing portion (U5) in opposition to said fourth reversing portion at an angle of inclination ($\gamma$) between 0° to 30° to the preceding section and a height of 0° to 20° of the total profile height.

5. Apparatus as defined in claim 4, wherein each profile has a generally uniform change of curvature along its profile height.

6. Apparatus as defined in claim 4, wherein each profile has a thickness (s) upstream from said first reversing portion that is less than 20% of the distance (t) between the center lines of the two profiles.

7. Apparatus as defined in claim 1, wherein each profile has a thickness (s) upstream of the first reversing portion that is less than about 20° of the distance (t) between the center lines of two adjacent profiles.

* * * * *